Aug. 16, 1955 C. D. COLCHESTER 2,715,660

TIME CONSTANT CONTROL CIRCUITS FOR RADIO TELEPHONE AND SIMILAR SYSTEMS

Filed Feb. 13, 1950 2 Sheets-Sheet 1

Inventor:
Christopher Dering Colchester;
By his attorneys,
Baldwin, Wight, + Brevoort Aug. 16, 1955 C. D. COLCHESTER 2,715,660

TIME CONSTANT CONTROL CIRCUITS FOR RADIO TELEPHONE AND SIMILAR SYSTEMS

Filed Feb. 13, 1950 2 Sheets-Sheet 2

INVENTOR

Christopher Dering Colchester,

BY Baldwin & Wight

ATTORNEYS

United States Patent Office 2,715,660

Patented Aug. 16, 1955

2,715,660

TIME CONSTANT CONTROL CIRCUITS FOR RADIO TELEPHONE AND SIMILAR SYSTEMS

Christopher Dering Colchester, Brockham, Russell Green, Danbury, England, assignor to Marconi's Wireless Telegraph Company, Limited, London, England, a company of Great Britain Application February 13, 1950, Serial No. 143,996

Claims priority, application Great Britain February 24, 1949

4 Claims. (Cl. 179—171)

This invention relates to time constant control circuits for radio telephone and similar systems.

It is fairly common practice to employ a so-called constant volume amplifier to control the speech signal level fed into a radio transmitter so as to maintain that level at a value at which efficient modulation is obtained and to provide such an amplifier with a long time constant circuit to maintain its gain substantially constant over intervals in speech. Such a circuit is of particular use for control in circumstances such as those in which there are two parties to a conversation, one making only occasional monosyllabic replies to the other. In such circumstances it is required that the amplifier gain shall be adjusted suitably for such replies, for if the gain is too high the replies may be lost as a result of transmitter overload, if the gain is too low the replies may be inaudible, while if the gain increases rapidly during the period of monosyllable, the replies may be so distorted as to be unrecognizable.

Figure 1:
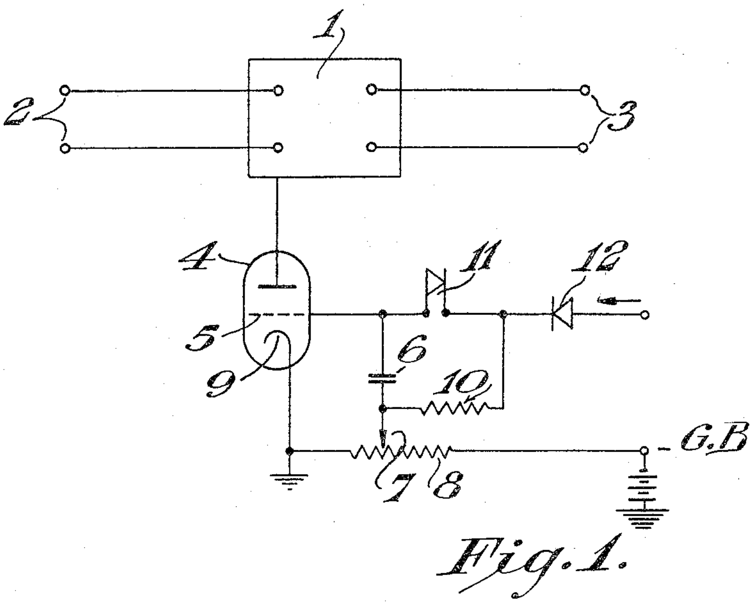
Figures 2, 4:
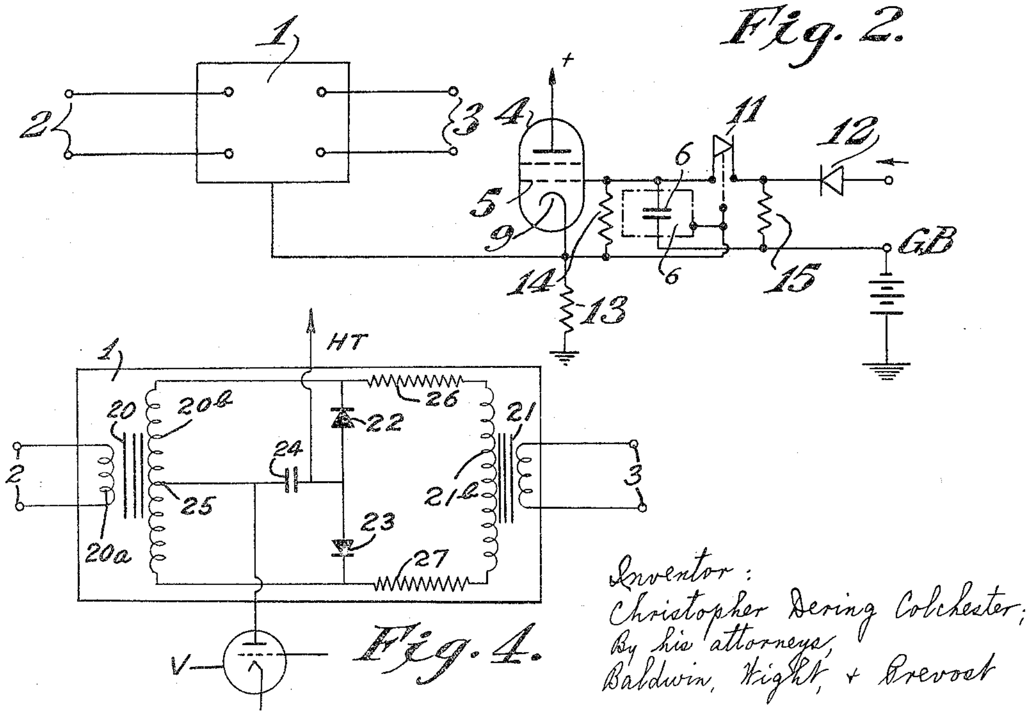
Figure 3:
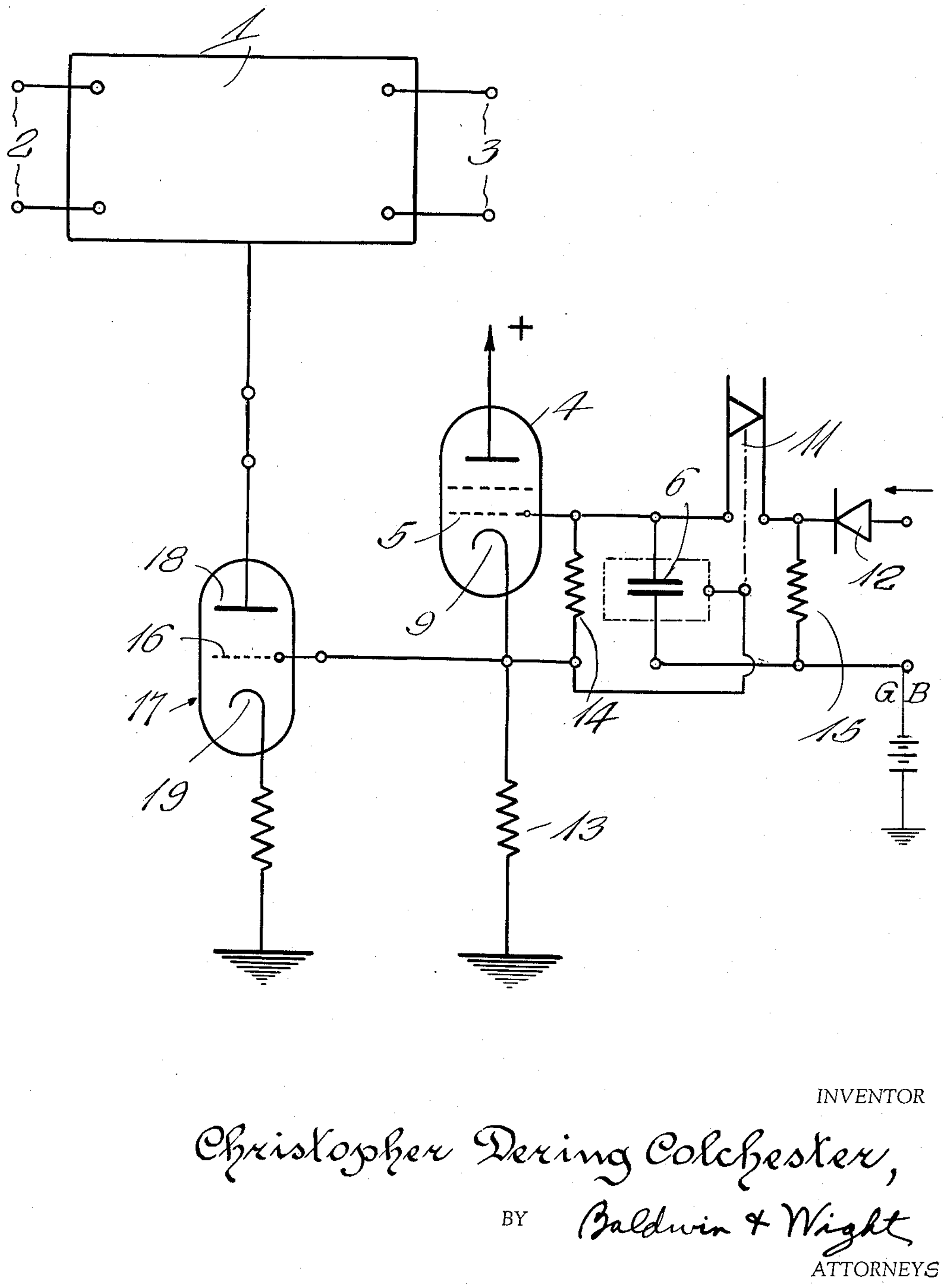

The invention is illustrated in and further explained in connection with the accompanying drawings in which Fig. 1 is a diagram, provided for purposes of explanation, of a known arrangement; Fig. 2 is a diagram of a preferred embodiment of the present invention; Fig. 3 shows a modified circuit embodying my invention; and Fig. 4 illustrates a conventional attenuator circuit and the manner of establishing connection therewith from associated circuits.

In one known time constant circuit arrangement for control to obtain approximately constant volume, and which is represented diagrammatically in Fig. 1, a variable attenuator 1 is included in the speech channel between input terminals 2 and output terminals 3 and the loss of the attenuator is determined by the anode current of a control valve 4. The control grid 5 of this valve is connected to one side of a condenser 6 the other side of which is connected to an adjustable tap 7 on a resistance 8 which is in circuit between the valve cathode 9 which is at earth potential, and a suitable negative potential source connected at —GB. The source —GB is a grid bias battery connected at one side with the grid and at the other side with the cathode through earth connections and resistance 8. Across the condenser 6 is a resistance 10 in series with a pair of contacts 11 arranged to be opened by a suitable auxiliary control (not shown) in the absence of speech, the contacts 11 being on the grid side of resistance 10. Speech input is applied through a rectifier 12 one side of which is connected to the junction of the resistance 10 with the contacts 11. The network comprising rectifier 12, condenser 6, resistances 8 and 10, and contacts 11 develops a control voltage which is built up across the said condenser 6 and thus applied to the grid 5 of the valve. When the contacts 11 are opened the charge in the condenser 6 cannot leak away except through the insulation of the condenser itself or of the valve holder or envelope or of the contact unit or as the result of grid current. If, therefore, the insulation is high at all times and the grid current is low enough the voltage on the grid 5 of the valve and therefore the anode current of the valve will remain substantially constant. In fact, the actual grid current is the resultant of normal grid current due to interception of electrons leaving the cathode with sufficient velocity to overcome the negative bias and grid current due to secondary emission from the grid. The resultant may be made zero but the balance is extremely critical and is dependent to a high degree upon the temperature of the electrodes and the age of the valve. Moreover the insulation which, as already explained, is a factor in controlling leakage of the condenser charge, is extremely difficult to maintain constant, more especially in conditions of humidity and temperature such as are encountered in the tropics. For these reasons the known circuit of Fig. 1 lacks constancy of operation: indeed in one arrangement practically tested in which the charge on the condenser 6 was intended to fall according to a time constant of 2000, it was found in one test that, owing largely to dust and humidity, the time constant was only 200 while, in another test on another occasion, the condenser charge was found actually to increase.

The present invention seeks to avoid the above mentioned defects and to provide an improved time constant control circuit of high constancy of performance.

According to this invention a time control circuit arrangement including a rectifier and condenser network wherein the charge on the condenser controls the current through a valve to determine the loss or gain in a signal channel is characterized in that the cathode of the valve is connected to earth (or equivalent point of fixed potential) through an impedance of the same order of value as the internal impedance of the valve and a resistance of predetermined value is connected between the control grid and cathode of the said valve so as to cause the time constant to approximate closely to a value determined by said resistance, the control of the signal channel being effected in dependence upon the potential of the cathode with respect to earth (or equivalent point of fixed potential).

Preferably the condenser and any contacts in the network are provided with guard electrodes connected to the cathode so that any insulation leakage takes place to the cathode and not to earth (or equivalent fixed potential point).

Preferably also the valve is a tetrode, pentode or similar valve of high amplification factor.

A preferred embodiment of the invention is represented diagrammatically in Fig. 2. Here the control of a variable attenuator 1 in a speech channel between input terminals 2 and output terminals 3 is effected by voltage taken from the cathode 9 of a control valve 4—preferably a pentode or, as indicated a tetrode, with an amplification factor of about 1000—the said cathode being connected to earth through a resistance 13 of about the same value as the internal resistance of the said valve 4. The attenuator 1 has a variable gain and signals being transmitted from input terminals 2 to output terminals 3 are subjected to loss or gain, dependent upon the control potential supplied from valve 4 in Figs. 1 and 2, or valve 17 shown in Fig. 3. This control is produced by application of bias potential to the attenuator 1. As examples of the type of apparatus employed in attenuator 1 I may mention the conventional automatic volume control system; a simple valve with an input circuit and an output circuit, and grid bias controlled by the applied potential is another example; and a valve connected between a pair of lines so as to act as a variable shunt and with its bias controlled by the applied potential is still another example. In the drawings the block 1 with its input terminals 2 and output terminals 3 and the control lead from valve 4 in Figs. 1 and 2 and from valve 17 in Fig. 3 is intended to embrace all of these conventional methods of attenuation control. In Fig. 4 I have shown a conventional attenuator circuit of the kind which is employed in attenuator 1. In the arrangement illustrated in Fig. 4, the input terminals 2 and the output terminals 3 of the attenuator 1 are identified by reference characters corresponding to the same reference characters in Figs. 1–3. Valve V corresponds to the valve 4 of Figs. 1 and 2 or the interposed valve 17 of Fig. 3. The input transformer of the attenuator is shown at 20 while the output transformer is indicated at 21. The input transformer 20 includes primary winding 20*a* connected with input terminals 2, while secondary winding 20*b* connects with rectifiers 22 and 23 disposed in opposed polarity arrangement with their centerpoint connected through condenser 24 with center tap 25 on secondary winding 20*b*. The circuit connection, from the valve 4 or 17, designated V, is established from the anode of the valve to the midtap connection 25 of secondary winding 20*b*. The outer terminals of secondary winding 20*b* connect with opposite potential points of rectifiers 22 and 23 and through impedances 26 and 27 to the opposite terminal of the primary winding 21*b* of transformer 21. If desired, and preferably, instead of directly controlling the attenuator by the cathode voltage, said voltage is applied as shown in Fig. 3 to the control grid 16 of a subsequent valve 17 having cathode 19, control grid 16 and anode 18, the anode current from anode 18 of which is employed to control the attenuator 1 i. e. a second valve 17 is interposed between the cathode 9 and the attenuator 1. The cathode 9 of the control valve is connected to the control grid 5 thereof through a resistance 14 of about one megohm. The control grid 5 is also connected to a bias source at GB through a pair of contacts 11, arranged to be opened in the absence of speech by an auxiliary control (not shown), in series with a resistance 15 and through earth connections and resistance 13 with cathode 9. Speech input is applied through a rectifier 12 to the junction of this resistance 15 with the contatcs 11. A condenser 6 is connected between the control grid 5 and the bias source whereby the bias on grid 5 is derived from the charge on condenser 6 when the contacts 11 are open. Guard electrodes represented schematically in chain lines are provided for the condenser 6 and for the contacts 11 and are connected to the cathode 9 of the control valve.

With this arrangement, the provision of the resistance 13 causes the impedance to earth at the control grid 5 to be multiplied by a factor of the same order as the amplification factor of the valve as compared to that which would apply if the cathode 9 were directly earthed. It therefore becomes possible to add a resistance (the 1 megohm resistance 14) between cathode 9 and grid 5 so that the rate of discharge of the condenser 6 is no longer dependent on stray leakage but is definitely controlled. The guard electrodes cause leakage to take place to the cathode. It will be appreciated that internal leakage in the condenser 6 will still be important in this circuit but there is no real practical difficulty in obtaining condensers with internal insulation resistances exceeding $10^4$ megohms.

By virtue of the resistor 14 connected between the control grid and cathode of the valve 4 any change in potential at the grid connected side of condenser 6 will be opposed by the voltage applied to that condenser by resistance 14 owing to its connection to the cathode resistor 13. Thus an increase in positive potential at the grid connected side of the condenser causes the grid 5 to go positive and the resultant increase in current flow along resistor 13 renders the cathode more positive thereby applying voltage through 14 to the condenser 6 which opposes the voltage change in the grid. In this way the rate of discharge of condenser 6 is controlled.

While I have described my invention in certain preferred embodiments, I realize that modifications may be made and I desire that it be understood that no limitations upon my invention are intended other than may be imposed by the scope of the appended claims.

I claim:

1. In a signal transmission system of the kind in which the loss or gain of a signal channel included in said system is automatically controlled by a control valve in dependence upon the charge on a condenser fed with rectified signals; a signal transmission channel of variable loss or gain; a control valve including at least a cathode, a control grid and an anode connected to control said loss or gain in dependence upon the current flow through said valve; input and output circuits connected with said control valve; a cathode return circuit for said control valve; an impedance of the same order of magnitude as the internal impedance of said valve included in said cathode return circuit of said valve; a condenser included in said input circuit; a time constant circuit including said condenser and a resistance of predetermined value which is connected between the control grid and cathode of said valve, said resistance being the time constant determining element in said time constant circuit and connected to apply a voltage from the cathode impedance to said condenser to oppose any change in potential at said condenser and thereby control the rate of discharge of said condenser; means including a rectifier for applying signal energy to said condenser to charge the same; and a control circuit from the cathode of said valve to said channel to control the loss or gain thereof in dependence upon the potential of said cathode with respect to a point of fixed potential.

2. Apparatus as set forth in claim 1 wherein the valve is a high gain multi-grid valve.

3. Apparatus as set forth in claim 1 in which a further valve is included in the control circuit between the cathode of the control valve and said channel, said further valve controlling the loss or gain of said channel in dependence on the anode current of said further valve.

4. Apparatus as set forth in claim 1 wherein a variable attenuator is included in said channel and the control of the loss or gain thereof is effected by controlling said attenuator.

References Cited in the file of this patent

UNITED STATES PATENTS

| | | |
|---|---|---|
| 2,294,863 | Hadfield | Sept. 1, 1942 |
| 2,399,213 | Edwards | Apr. 30, 1946 |
| 2,480,842 | Farnsworth | Sept. 6, 1949 |
| 2,582,714 | Meier | Jan. 15, 1952 |